United States Patent [19]

Otterson

[11] Patent Number: 5,553,621
[45] Date of Patent: Sep. 10, 1996

[54] DOPPLER AUDIO DEALIASING

[75] Inventor: Scott D. Otterson, Issaquah, Wash.

[73] Assignee: Siemens Medical Systems, Inc., Iselin, N.J.

[21] Appl. No.: 414,979

[22] Filed: Mar. 31, 1995

[51] Int. Cl.$^6$ ........................................ A61B 8/00
[52] U.S. Cl. ........................................ 128/661.09
[58] Field of Search ............... 128/660.04, 660.05, 128/660.07, 661.08, 661.09, 662.02; 73/861.25

[56] References Cited

U.S. PATENT DOCUMENTS 5,148,808  9/1992  Satake ........................... 128/660.05
5,188,113  2/1993  Sato et al. ........................ 128/660.05

*Primary Examiner*—George Manuel

[57] ABSTRACT

A Doppler audio dealiasing system has a zero inserter that inserts zeros between input samples of signal. The resultant signal is then processed in various ways. After the zeros are inserted and a new signal is formed, the newly formed signal is filtered and otherwise processed to remove inappropriate parts.

30 Claims, 8 Drawing Sheets

DOPPLER AUDIO DEALIASING

BACKGROUND OF THE INVENTION

1. Field of the Invention

This invention relates to Doppler ultrasound medical systems and more particularly to the dealiasing Doppler audio output signals for improved sound quality in the audio output of the sampled data.

2. Description of the Related Art

In the medical industry, ultrasound systems have gained popularity for medical diagnosis because they are non-invasive and are capable of providing a detailed and accurate imaging of components of the body. Real-time Doppler ultrasound systems are used to image motion such as blood flow through arteries or the heart.

The Doppler effect is a physical phenomenon present when the source of a wave or signal is moving relative to its observer. The frequency (or inversely, the wavelength) of the signal increases or decreases depending upon the direction of motion. Doppler ultrasound signals can be transmitted as a "continuous" wave or a "pulsed" signal. By measuring the frequency of a sound signal which echoes off blood moving through an artery, for example, the velocity of the blood can be estimated.

Doppler ultrasound systems typically include two forms of signal output. A scrolling spectrogram image provides visual output while sound through stereo speakers provides audio output. Doppler ultrasound can determine the presence or absence of flow, the direction and speed of flow, and the character of flow.

In spectral Doppler ultrasound, the Doppler-shifted echoes coming from ultrasound fired into the body are received in analog form and are captured by the system's transducer. FIG. 1 shows a Doppler ultrasound system 10 which includes a transducer 11 for receiving an electrical pulse transmitting an ultrasonic pulse 12 into a reflection zone such as a region including a blood vessel 13. The reflection zone reflects sound echoes 14 back to the transducer 11.

Beamformer 15 controls the firing of the transducer 11 as well as delaying and summing the sound echo signals 14 received by transducer 11. The summed radio-frequency signal (RF) is then transmitted to a complex modulator and lowpass filter represented by box 16 to create the complex "baseband" signals that are conventionally referred to as the in-phase (I) and quadrature (Q) signals or "I/Q" signals 17. The I/Q signals then pass through a sampler, sometimes called a "range gate" 18.

The output of the sampler is processed for spectral display. The sampler output is also separated into forward and reverse components which are fed to a pair of stereo speakers. The sampler introduces an artifact called "aliasing" which is explained with reference to FIGS. 2 and 3.

FIG. 2 represents the frequency spectrum of a Doppler I/Q signal before sampling (the absolute value of the Fourier transform is on the y-axis and the frequency is on the x-axis). The positive portion of the frequency spectrum is to the right of DC and the negative portion is to the left.

FIG. 3, on the other hand, shows the signal of FIG. 2 where the sampling process of the ultrasound system of FIG. 1 has aliased the signal. The resultant aliasing of the signal in FIG. 2 as shown in FIG. 3 is described as follows: Any components in the I/Q input signal 17 with frequencies above half of the sampling frequency are "aliased." In FIG. 3, components above $+F_s/2$ have wrapped around to negative frequencies. To the spectral display processor and the audio forward/reverse split, these aliased positive frequencies will appear negative, i.e. without correction, with the result that flow towards the transducer will be mapped as flow away from the transducer.

Again referring to FIG. 1, in the case of a spectrogram image on display 20a received from processor 20b, if the spectral image is aliased, the operator viewing a display screen can manually rotate or shift the spectral display by adjuster 21 so that the aliased frequencies are displayed correctly. Alternatively, the image can be rotated or shifted automatically. In either case, in practice, the preferred scanning mode is to scan with heavy aliasing, even as high as 100%. In such a case if the reverse flow is not of concern, the baseline can be adjusted to devote the entire range of velocity detection to forward flow. This technique doubles the maximum velocity that can be measured but leaves a very bad, aliased audio signal.

Therefore, it is highly desirable to duplicate the frequency spectrum of FIG. 2 before it is processed for audio output, that is, to provide a signal which is alias-free.

The above discussion provides the manner in which a particular type of ultrasound machine samples a signal. Other sampling configurations are also known. For example, in some machines the transducer elements control the delay and summing instead of the beamformer as discussed above. Moreover, this discussion is also intended to cover sampling of any type of Doppler processor.

SUMMARY OF THE INVENTION

This invention provides Doppler audio dealiasing by inserting zeros between input samples and then processing the resultant signal in various ways. Accordingly, after the zeros are inserted and a new signal is formed, the newly formed signal is filtered to remove inappropriate parts.

Several embodiments of this invention are described in detail below. All embodiments include inserting a zero between each pair of complex I/Q points. The zero insertion creates images which restore signal power to the correct frequencies but which also puts power at undesirable frequencies. The differences between the embodiments described below are in the ways the undesirable components are removed.

While it is possible to configure this invention in a variety of manners, two particular configurations are discussed in detail below. First, this invention is carried out by providing dealiasing alone. Also described below is a second configuration including the combination of dealiasing with a forward/reverse split.

The dealiasing-alone embodiments include filters for filtering inappropriate frequency components out of the spectrum to produce the desired frequency spectrum. A complex coefficient lowpass FIR or IIR is used when the embodiment requires a filter with a non-symmetric passband. Another embodiment includes the use of modulators which shift a nonsymmetric passband so that it becomes a symmetric passband and thus the filters may have real coefficients. In such a case this invention uses halfband FIRs or IIRs. The output of these dealiasing-alone structure embodiments requires further processing for the forward/reverse split.

In the embodiment including dealiasing combined with a forward/reverse split, there is an improved computational efficiency of the total audio processing chain over separate dealiasing-alone and forward/reverse split procedures. Moreover, the embodiments described include time varying coefficients FIRs to improve efficiency. The use of IIRs is also described in that under certain circumstances there are fewer multiplies than for FIRs for the same frequency response.

In implementing this invention, purely digital components can be used or a digital/analog hybrid component configuration can be used.

DETAILED DESCRIPTION

As discussed in the summary above, this invention provides Doppler audio dealiasing by inserting zeros between input samples and then processing the result in various ways. After the zeros are inserted and a new signal is formed, the newly formed signal is filtered to remove inappropriate parts.

Several embodiments of this invention are described in detail below. All embodiments include inserting a zero between each pair of I/Q points. The zero insertion creates images which restore signal power to the correct frequencies but which also put power at undesirable frequencies. The differences between the embodiments described below are in the ways the undesirable components are removed.

While it is possible to configure this invention in a variety of manners, two particular configurations are discussed in detail below. This invention is carried out by providing dealiasing alone. Also described below is a combination of dealiasing with a forward/reverse split.

Figure 1:
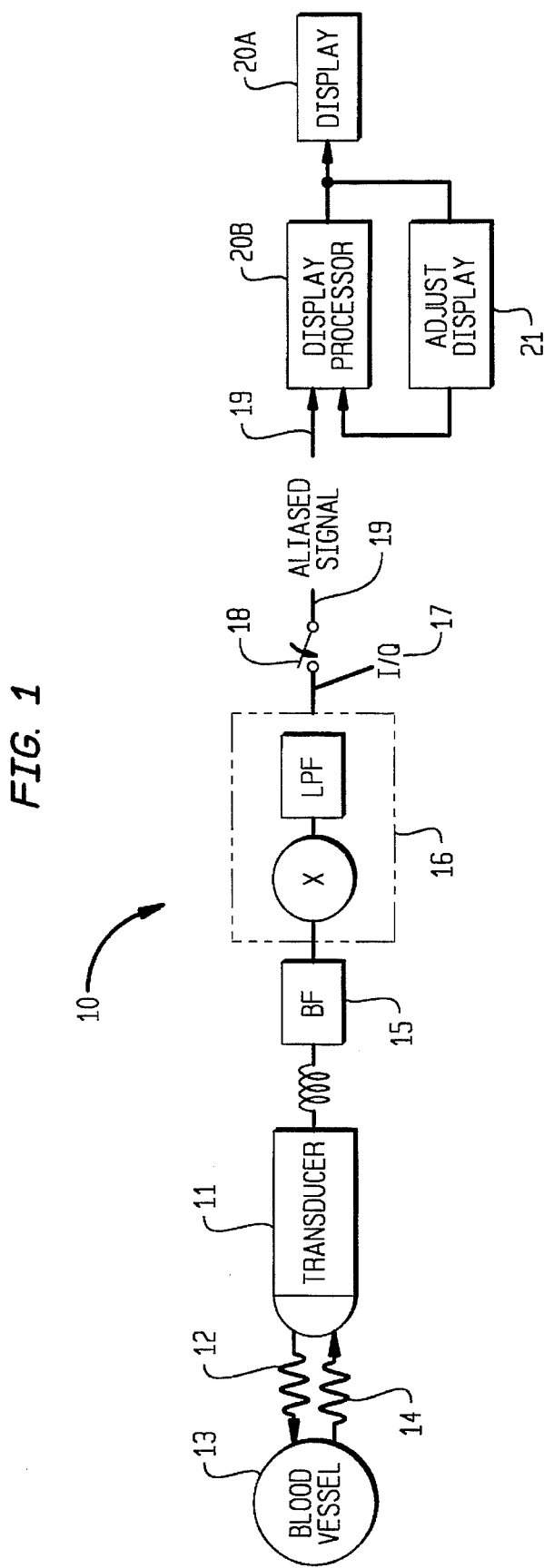
FIG. 1 is a diagram depicting a Doppler ultrasound machine which generates an aliased signal.

FIGS. 4a–d show an arrangement according to the invention for inserting zeros into a stream of input sample signals, and illustrate the effect of the zero-insertion. The aliased signal 19 (see FIG. 1) is processed by a processor 20b for two-dimensional spectral display on a display unit 20a. The display shows images in either gray-scale pixels or color pixels. In one application, the operator of the ultrasound machine will view the spectral display looking at the baseband to see the aliasing. According to his or her judgement, the operator will rotate or shift the image to eliminate the presence of aliasing in the spectral display output. In a different application, the rotation or shift occurs automatically. In either case, the spectrum is adjusted by adjuster 21. The operator or auto-shift routine provides information to processor 24 about the shift or rotation, which is then used to dealias the audio signal as discussed below. In a different case, the shift information provided to processor 24 does not require spectral information.

Figure 2:
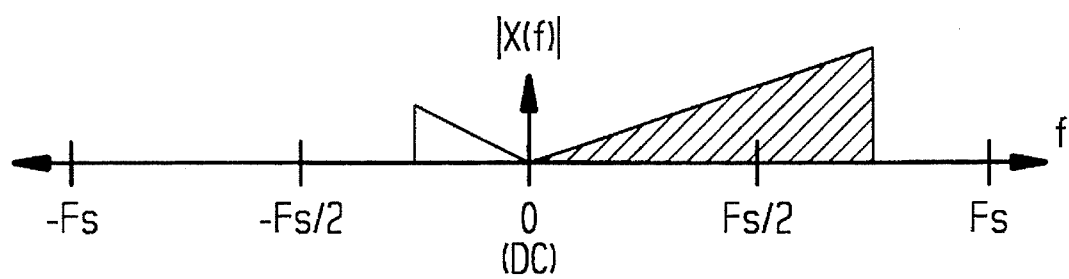
FIG. 2 shows a representational example of a frequency spectrum of a Doppler signal before sampling and the desired signal output.
Figure 3:
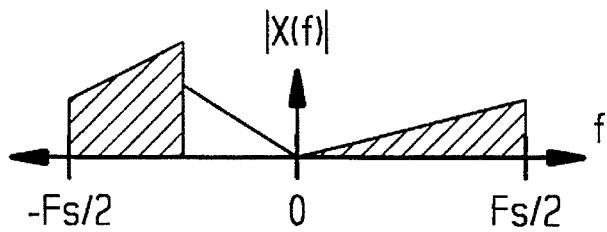
FIG. 3 shows a representation of the aliasing wraparound of the signal of FIG. 2 after sampling.

As discussed above, FIG. 3 depicts a representation of the aliasing wraparound of the signal of FIG. 2 after sampling. The signal processing of this invention is directed to dealiasing the signal 19 to obtain an output as shown in FIG. 2.

In the two embodiments discussed below, that is, where dealiasing alone is provided or a combination of dealiasing with forward/reverse split is provided, the zero inserter 22 inserts zeros between each sample pair and then filter 24 (plus other processing elements) eliminates inappropriate parts of the resultant signal so that the desired signal of FIG. 2 is obtained. This signal processing is discussed in detail below.

Figure 4A:
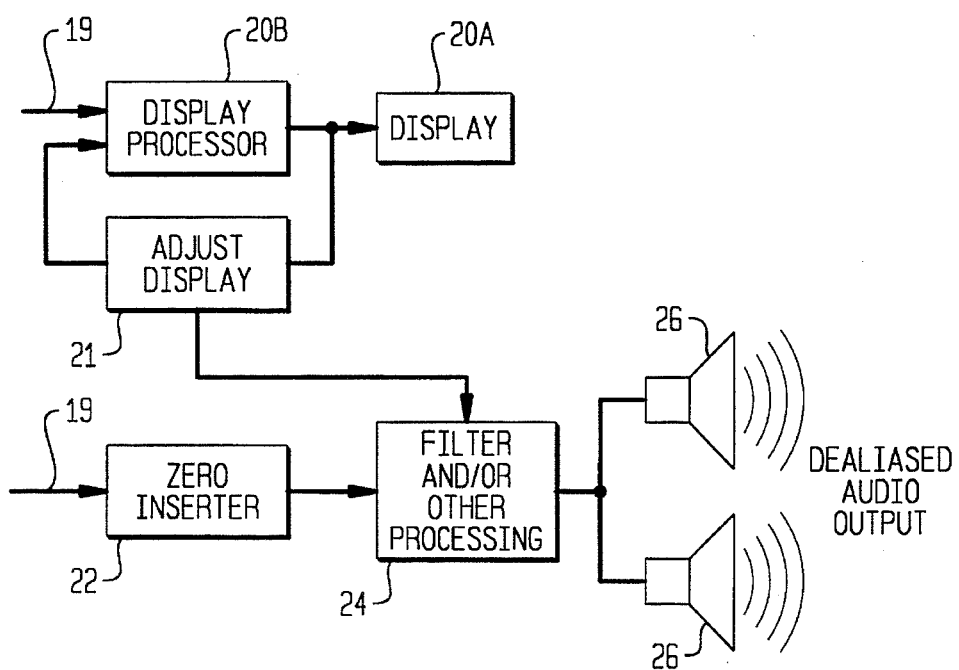
FIG. 4a is a diagram depicting the components of a Doppler ultrasound machine of this invention which dealiases the audio output.
Figure 4B:
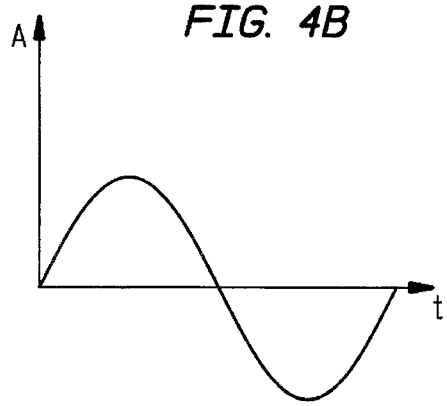
FIG. 4b is a graphic representation of the analog input of the Doppler ultrasound system of FIG. 1.
Figure 4C:
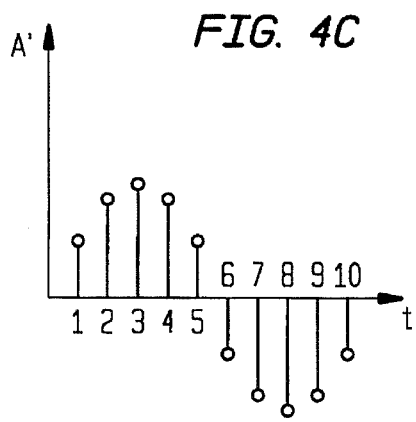
FIG. 4c is a graphic representation of a digitized signal of the output of FIG. 4b.
Figure 4D:
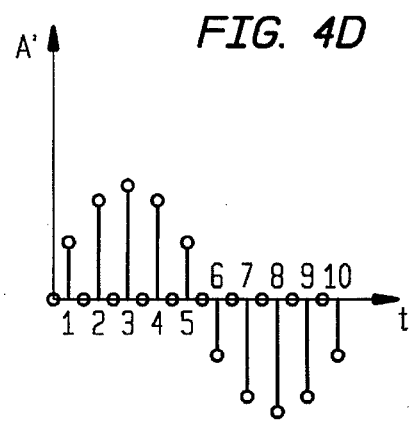
FIG. 4d is a graphic representation of zeros inserted into the digitized signal output of FIG. 4c

To visualize the process of inserting zeros and its result, refer to FIGS. 4b, 4c and 4d. FIG. 4b shows a representation of an analog input signal 19 (see also FIGS. 1 and 4a), which has a time-domain amplitude A. FIG. 4c is a graph representing the signal of FIG. 4b in a sampled, discretized form, with a frequency-domain amplitude A'. FIG. 4d is a graph representing zeros inserted between each sample. In other words, zero values of A' of the signal are placed between samples 1 and 2, between samples 2 and 3, etc.

Inserting zeros can be done in different manners depending upon whether the signal is analog or digital. In implementing this invention, purely digital components can be used or a digital/analog hybrid component configuration can be used.

In the two embodiments discussed, that is, where dealiasing alone is provided or a combination of dealiasing with forward/reverse split is provided (with any type of filter and modulation elements), the effect of zero insertion can be demonstrated mathematically. If the input signal is $x(m)$, then the zero-inserter output, $w(n)$, is $$w(n) = \begin{cases} x\left(\frac{n}{2}\right) & n = 0, \pm 2, \pm 4, \ldots \\ 0 & \text{elsewhere} \end{cases} \quad \text{(EQ 1)}$$

Note that a consequence of this operation is the doubling of the effective sample rate.

The zero-inserter 22 output contains the spectrum of its input plus images which now require filtering to remove the inappropriate portions of the new signal. The benefits of this are explained below.

The frequency domain of the zero-inserter output is obtained using the discrete Fourier transform (although the continuous Fourier transform may also be used with suitable, well-understood adaptations):

$$W(e^{j\omega}) = \sum_{n=-\infty}^{n=\infty} w(n) \cdot e^{-j\omega n} \quad \text{(EQ 2a)}$$

$$= \sum_{n=-\infty}^{n=\infty} x(n) \cdot e^{-j\omega 2n} \quad \text{(EQ 2b)}$$

$$= X(e^{-j2\omega}) \quad \text{(EQ 2c)}$$

where $\omega$=is the frequency of interest and W and X are the Fourier transforms of w and x, respectively.

Since $X(e^{-jw})$ is sampled twice around the unit circle, the spectrum repeats, or has "images" centered at $F_s$; the dealiased signal can be obtained by using a filter to remove the inappropriate parts of the image.

Figure 5:
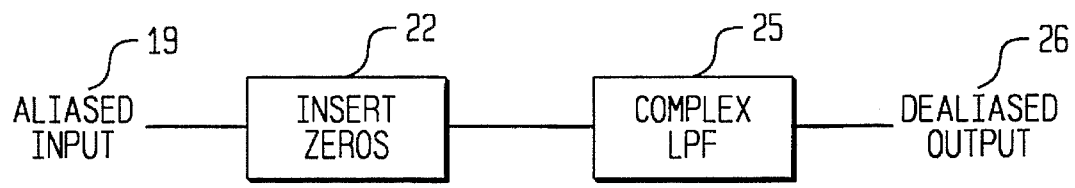
FIG. 5 shows a dealiasing structure of this invention.
Figure 6:
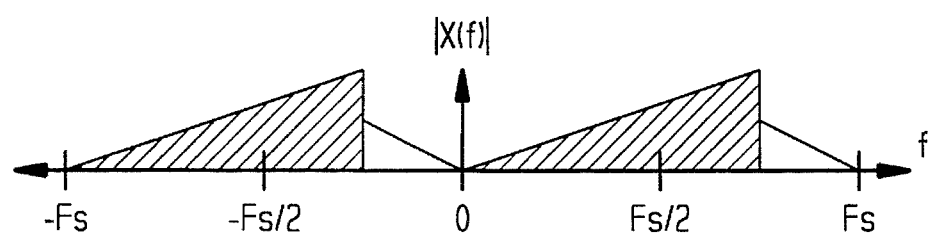
FIG. 6 illustrates the frequency spectrum of the signal of FIG. 3 after zero insertion.

FIG. 5 shows an embodiment of the dealiasing-alone structure of this invention where the aliased input 19 is processed by a zero inserter 22. Accordingly, the result of inserting zeros is that the aliased signal is changed from that shown in FIG. 3, and therefore also differs from the original input signal in a manner which is shown in FIG. 6 which shows a frequency spectrum where, after sampling, a zero has been inserted between each sampled signal. This imaging maps aliased components to the place they would have been had the sampling rate been twice as high. Thus, FIG. 6 illustrates the frequency spectrum of the signal of FIG. 3 after zero insertion.

Figure 7:
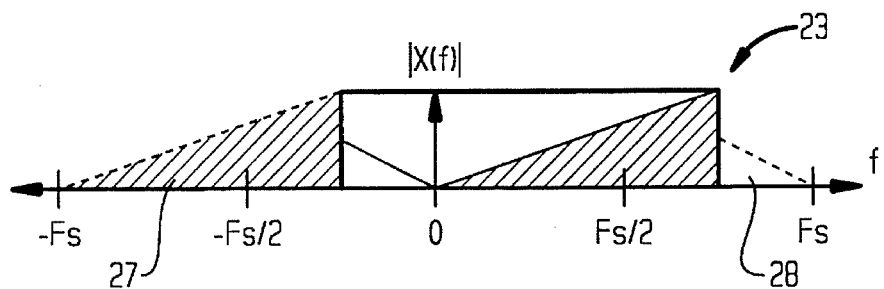
FIG. 7 shows the passband of a complex LPF superimposed on the zero-inserted input.

In both the dealiasing-alone configuration and the dealiasing with the forward/reverse split configuration, the filter used in accordance with this invention depends upon the filter cutoffs required to retrieve the signal. For example, the lowpass filter in FIG. 7 is not symmetric about DC and therefore must have complex coefficients. Thus, the system configuration of FIG. 5 operating on a signal as shown in FIG. 6 includes a complex lowpass filter, LPF 25, to retrieve the signal as shown in FIG. 7. The recovered portion of the spectrum, which is the complex LPF's output, is designated by lowpass filter (LPF) region 23 in FIG. 7. Thus, the inappropriate portions 27 and 28 are removed from the spectrum, leaving passband 23, which is the same as the signal shown in FIG. 2.

Since the original signal power is spread over two spectral copies, a gain of two is required so that the lowpass filter result has a unit gain. By scaling the coefficients (times-two coefficient scaling is assumed here and also in the discussion below) valuable CPU time can be saved. Alternatively, subsequent amplifier stages, which increase the gain of the signal.

As mentioned above, the filter used in accordance with this invention depends upon the filter cutoffs required to retrieve the signal. For different implementations, different types of filters having different filter cutoffs are used, such as FIR or IIR, complex lowpass, half-band or time varying coefficient. The filter cutoffs are correlated to the spectral display shift caused by adjuster 20b (see FIGS. 1 and 4a).

In the dealiasing-alone configuration shown FIG. 5, where this invention uses a complex LPF 25, it is also desirable to implement processing time-saving methods and devices, particularly since, by inserting zeros, the sampling rate increases or doubles. Therefore filtering is required at a high computational expense. Computational efficiency can be improved by using a time-varying coefficient, multirate LPF for dealiasing, with or without a modulator. In such a case, only performing the convolution multiply/add for inputs which are non-zero avoids redundant calculations. The benefit of using such a filter can be shown mathematically, where if the N-point lowpass filter impulse response is h(n), then the convolution sum is:

$$y(n) = \sum_{k=0}^{n-1} h(n-k) \cdot w(k) \quad \text{(EQ 3)}$$

Since every other filter input is zero, EQ. 3 can be decomposed into even and odd terms as follows:

$$y(n) = \begin{cases} \sum_{k=0}^{\frac{N}{2}-1} h(n-2k) \cdot x(k) & n \text{ even} \\ \sum_{k=0}^{\frac{N}{2}-1} h(n-2k-1) \cdot x(k) & n \text{ odd} \end{cases} \quad \text{(EQ 4)}$$

When the filter is implemented with EQ. 4 instead of EQ. 3, the number of multiply/adds is reduced by a factor of two.

Figure 10A:
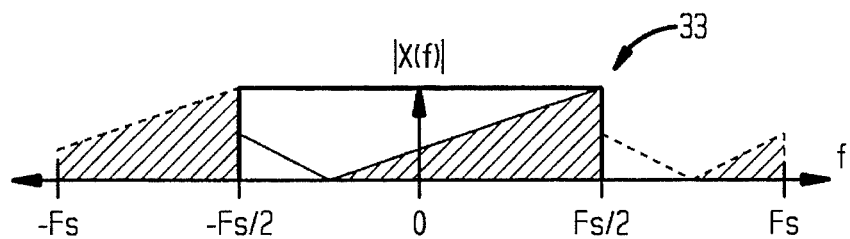
FIG. 10a shows the frequency spectrum of FIG. 7 except that it has been rotated to allow the use of an LPF with a symmetric passband.

In a different dealiasing-alone embodiment, complex coefficients are not present. With a complex cosine or sine modulator 31, the zero-inserted signal is shifted or rotated so that it is centered around DC (see FIG. 10a).

Figure 10B:
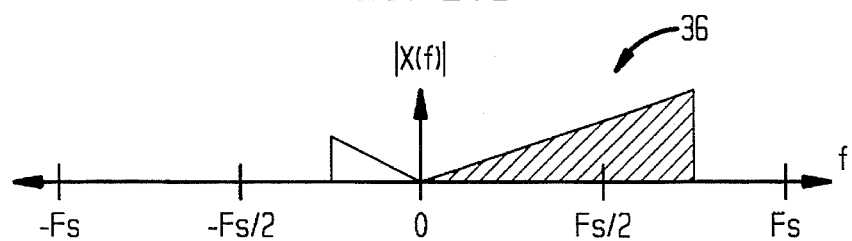
FIG. 10b shows the lowpass filtered signal of FIG. 10a modulated to its proper position.

The passband of the lowpass filter discussed above is equal to half the post-zero-insertion sample rate. For half-band FIR filters with an odd number of coefficients, every other coefficient (except for the center one) is zero, and therefore, the number of filter multiply/adds can be reduced by approximately another factor of two. If the half-band filter 32 is IIR, known methods may be used to efficiently reduce the number of poles and zeros for same frequency response. Moreover, after the signal is filtered it is again modulated by modulator 34, thus obtaining the desired spectrum (see FIG. 10b).

Figure 9:
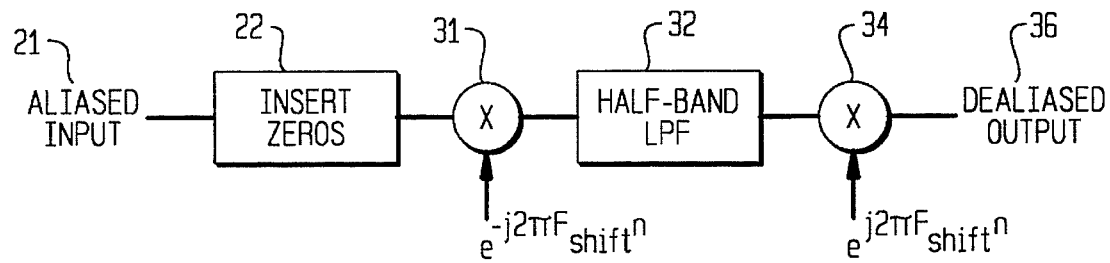
FIG. 9 depicts a dealiasing structure employing half-band filters.

While the number of multiply/adds is reduced substantially with the implementation shown in FIG. 9, there is an inherent addressing complexity in the half-band LPF 32 convolution. Programmable digital signal processing (DSP) chips are most efficient for FIR structures where a linear delay line shifts data past filter coefficients. However, in the implementation of FIG. 9, the pattern for selecting coefficients and data which are both non-zero is highly irregular. Accordingly, it is preferable to limit both the number of multiply/adds and additional address generation complexity.

Above, mainly the dealiasing-alone embodiment of this invention is discussed. Below, the dealiasing in combination with the forward/reverse split embodiment is described in detail.

In clinical practice, the Doppler audio signal is preferably separated into forward and reverse channels which are then output to left and right speakers. Beneficially, the process of separating the signal into positive and negative channels is can be combined with the filtering process necessary for audio dealiasing.

Figure 8A:
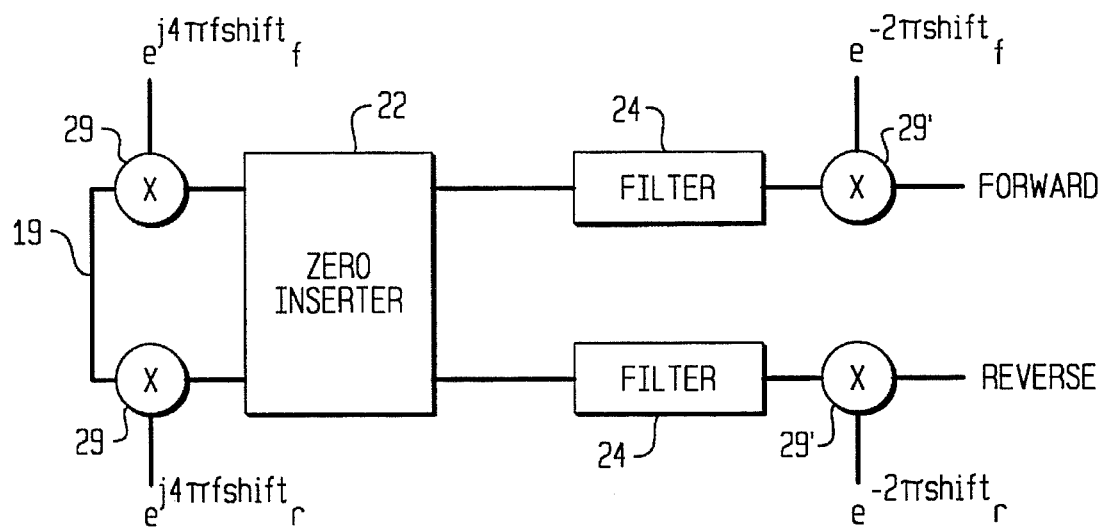
FIG. 8a shows a dealiasing arrangement.
Figure 8B:
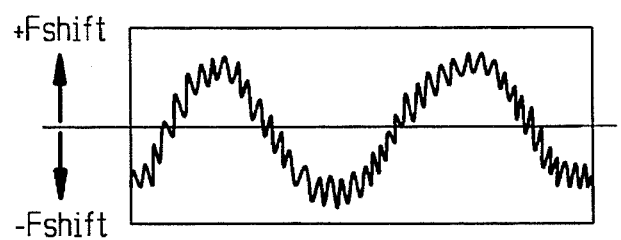
FIG. 8b shows a spectral display.

Turning to FIG. 8a, the relationship is shown between the rotation or shift in the spectral display image as provided by spectral display processor 21 and the shift provided by the filter and other processing components 24 in dealiasing. The aliased signal 19 is first rotated or shifted by modulator 29 for spectral display imaging. Zero inserter 22 inserts zeros. The signal is then operated upon by filter and other processing components 24 by the amount that the operator shifted the spectrum 29'. FIG. 8*b* is representative of a spectral display. The rotation of the image on the spectral display is mapped to provide filter cutoffs based on the amount that the operator rotates the spectral display. Accordingly, the shift information is processed by display processor 21, which is in communication with components 24 as shown in FIG. 4*a*.

Figure 11:
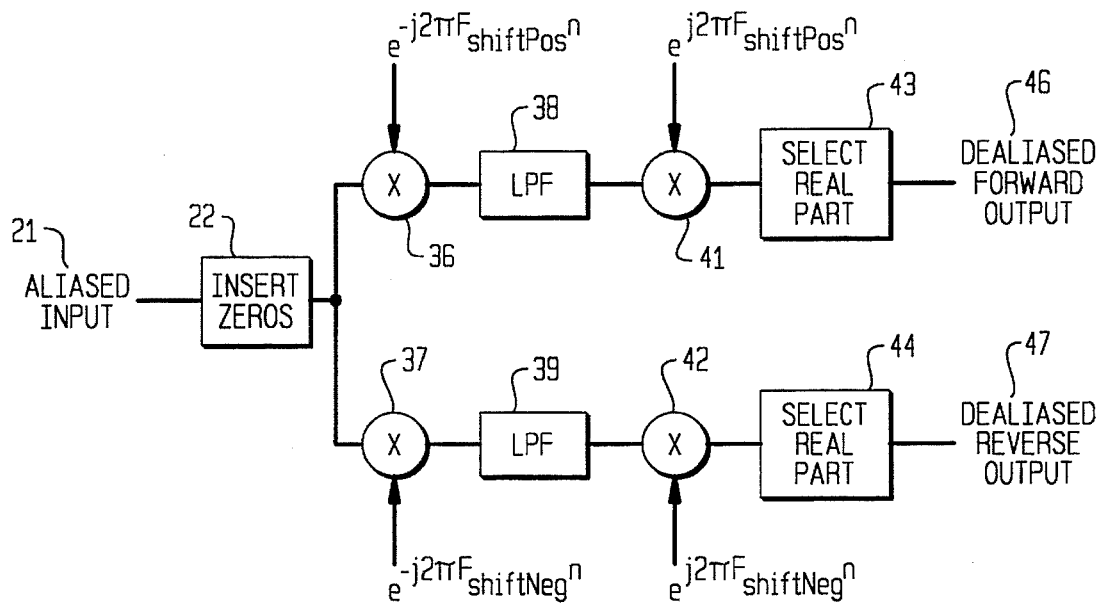
FIG. 11 shows an embodiment of this invention where the forward/reverse split of the signal is provided.

Referring to FIG. 11, a system including both dealiasing and a forward/reverse split is depicted. In addition to depicting stereo audio output (the dealiased forward and reverse output signals 46, 47). As with the methods described above, zeros are inserted between input samples 21 by zero inserter 22 (see FIG. 7). The new stream of signals then passes through modulators 36 and 37, which center the positive and negative portions of the spectrum about DC. In other words, the negative portion of the signal spectrum is shifted upward in frequency and the positive portion of the spectrum is shifted downward in frequency.

Figure 12:
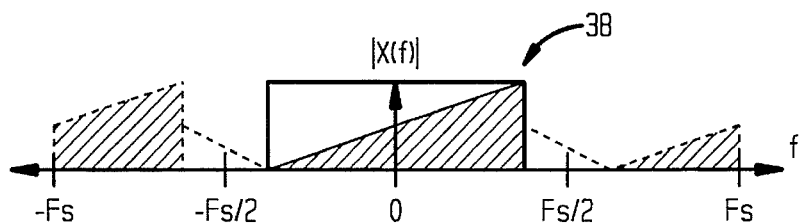
FIG. 12 shows the forward component of the signal generated by the system of FIG. 11 isolated by the lowpass filter.
Figure 13:
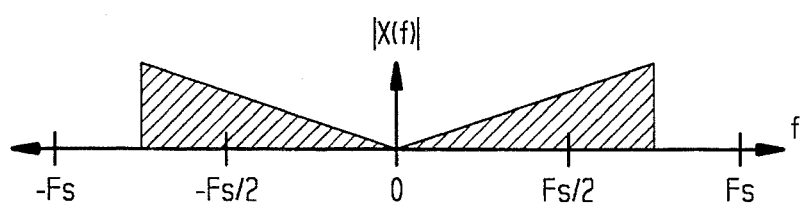
FIG. 13 shows the real part of the forward channel as provided by FIG. 11 which is the desired audio output.

The positive and negative components are then isolated with real-coefficient (FIR) low pass filters 38 and 39. FIG. 12 shows the positive component isolated by low pass filter 38. The separated channels are then rotated back to their proper frequencies by modulators 41 and 42. Selecting the real part of the positive and negative channels 43 and 44 yields the dealiased forward and reverse outputs, 46 and 47 respectively, which is fed to the speakers. The real part of the forward channel is illustrated in FIG. 13.

Above, the implementation shown in FIG. 11 is discussed assuming that low pass filters 38 and 39 are FIR filters. However, the same system can be implemented with Infinite Impulse Response (IIR) when processing signals. IIR filters require fewer multiplies than FIR filters and therefore are more computationally efficient.

Figure 14:
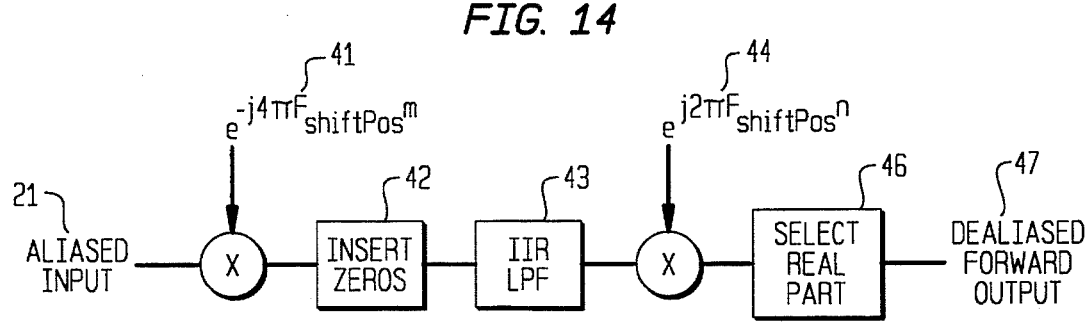
FIG. 14 shows a structure of this invention with the modulator positioned before the zero inserter and an IIR LPF.

FIG. 11 shows modulators 36 and 37 after zero inserter 22. In another embodiment for further improvement on the computational efficiency of this invention in both the dealiasing-alone configuration and the dealiasing combined with the forward/reverse split configuration, the first modulation of the signal is performed prior to inserting the zeros. Turning to FIG. 14, the aliased input 21 is sampled 21 and then modulated; note that the modulator 41 has no effect on the zero inserted samples. After modulation, the aliased input signal then undergoes zero insertion by inserter 42. The new signal stream then passes through an IIR LPF 43.

Figure 15:
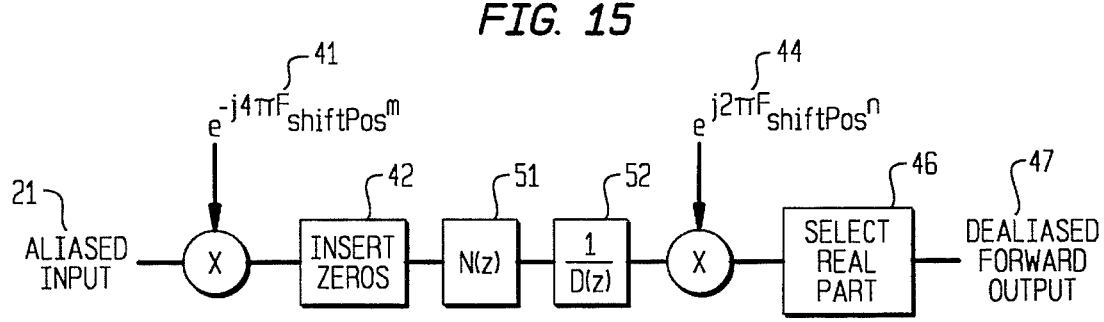
FIG. 15 shows a structure where the numerator and denominator of the IIR filter is cascaded.
Figure 16:
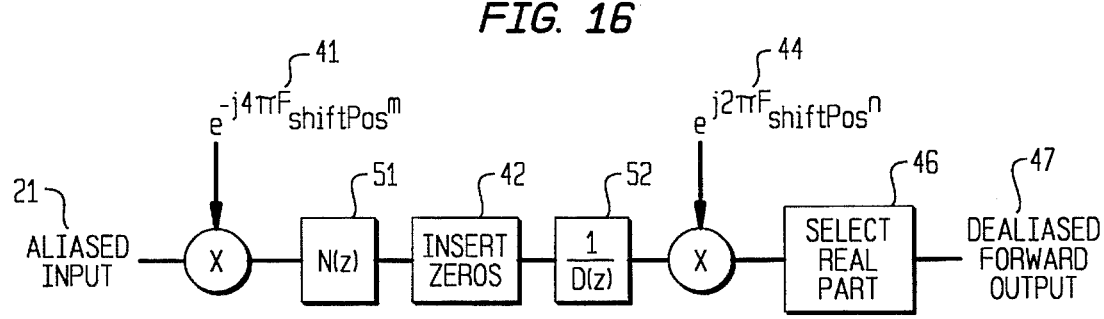
FIG. 16 shows a structure where the numerator of the IIR is positioned before the zero inserter.
Figure 17:
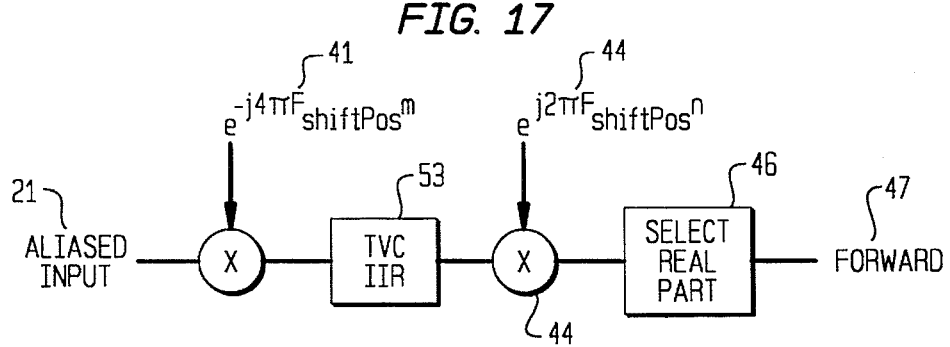
FIG. 17 shows a structure utilizing a time-varying coefficient IIR filter.

FIG. 14 illustrates processing for the positive frequency components; the negative portion of the channels is treated in a similar manner as the positive portion of the signal and is therefore not shown in FIGS. 15, 16 and 17. After modulation, the real part of the signal is selected 36 and the dealiased output is provided as signal 47.

The efficiency of the IIR LPF can be improved. An IIR filter with a numerator order N-1 and a denominator order D-1 can be expressed with the transfer function:

$$H(z) = \frac{\sum_{r=0}^{N-1} b_r \cdot z^{-r}}{1 - \sum_{r=1}^{D-1} a_r \cdot z^{-r}} \quad (EQ\ 5)$$

where $a_r$ and $b_r$ are the real coefficients of the denominator and numerator, respectively, of the transfer function, which can be chosen using known filter design routines.

Because multiplication in the z-domain is equivalent to convolution in the time domain, the transfer function H(z) can be implemented with two cascaded filters. FIG. 15 shows a system where the numerator 51 and denominator 52 of the IIR filter are cascaded. Thus, the numerator filter is FIR and, therefore, multiplication by zero can be avoided with the use of a time-varying coefficient structure. Effectively, this moves the numerator to the low sample rate side of the structure, that is, before zero-insertion in the signal path. Alternatively, the denominator can be moved to the low sample rate side.

FIG. 16 shows the numerator 51 at the low sample rate side of the structure. By modifying Eq. 5 so that the numerator filter state variables are only computed and stored at the pre-zero insertion rate, the system is computationally less expensive. That is, since half of the numerator FIR inputs are zeroes, only half of its coefficients must be applied during an output computation, i.e. it can be implemented with an efficient, time-varying-coefficient structure as in Eq. 4.

FIG. 17 shows the entire dealiaser when implemented with the multirate, time-varying-coefficient (TVC) IIR 53. Advantageously, the number of multiples and adds required for the combined dealiasing structures of FIGS. 15, 16 and 17 (when N(z) is implemented with time-varying coefficients) is approximately three-fourths of that required for the straight-forward implementation of FIG. 14.

In summary, by inserting zeros into the sampled signal, dealiasing can be effected by the structures shown in the figures as well as others designed for computational efficiency and cost effectiveness. The structures and methods described above provide a reliable manner in which to dealias an audio signal generated in a Doppler ultrasound system.

Either the dealiasing-alone or the combined dealiasing and forward/reverse split embodiments of the invention can be implemented as digital/analog hybrids. In such case, conventional digital-to-analog converters will be included in the signal path before any analog components.

I claim:

1. A method for generating a dealiased audio output signal in a doppler ultrasound system having a transducer which transmits and receives ultrasound signals, said transducer generating an ultrasound signal and receiving an echo of said ultrasound signal, wherein said echo is sampled by a sampler to generate a first stream of input sample signal pairs, wherein each input sample signal pair comprises an in-phase signal and a quadrature phase signal, wherein a first frequency spectrum of said first stream of input sample signal pairs comprises a set of unaliased first frequencies and a set of aliased second frequencies, said method comprising the steps of:

inserting a zero-frequency sample value between each pair of said input sample signal pairs to form a new signal stream of sample signals, wherein a second frequency spectrum of the new signal stream comprises the first frequency spectrum, a set of unaliased second frequencies and a set of aliased first frequencies; and filtering said new signal stream to remove said set of aliased second frequencies and said set of aliased first frequencies and generate an audio output signal having a third frequency spectrum comprising said set of unaliased first frequencies and said set of unaliased second frequencies.

2. A method as recited in claim 1 wherein said filtering step is performed by a filter selected from a group of filters including digital finite impulse response filters, infinite response filters, and analog filters.

3. The method of claim 1, in which the step of filtering is performed by a filter having an alterable frequency cutoff, and wherein the method further comprises prior to the step of filtering, the step of correlating the frequency cutoff to a spectral adjustment of a spectral display of the echo.

4. The method of claim 1, further comprising prior to the step of inserting, the step of modulating the first stream.

5. The method of claim 1, further comprising prior to the step of filtering, the step of modulating the new signal stream.

6. The method of claim 1, wherein said echo contains forward doppler frequency shift components and reverse doppler frequency shift components and wherein said method further comprises the step of separating said forward components from said reverse components to generate respective audio output signals at said filtering step corresponding to said forward components and reverse components.

7. A method for use in a doppler ultrasound system including a transducer which transmits and receives ultrasound signals, said transducer generating an ultrasound signal and receiving an echo of said signal, wherein said echo is sampled by a sampler to generate a stream of aliased input sample signals, wherein the combination of each of said input sample signals with the next sampled signal in said stream is an input sample pair, said method comprising the steps of:

modulating the input stream;

inserting a zero sample value between each of said input sample pairs to form a new signal stream which comprises a first spectrum of unaliased signal frequencies and a second spectrum of aliased signal frequencies corresponding to the unaliased signal frequencies of the first spectrum; and filtering said new signal stream to remove said second spectrum to provide a dealiased output signal.

8. A method for use in a doppler ultrasound system including a transducer which transmits and receives ultrasound signals, said transducer generating an ultrasound signal and receiving an echo of said signal, wherein said echo is sampled by a sampler to generate a stream of aliased input sample signals, wherein the combination of each of said input sample signals with the next sampled signal in said stream is an input sample pair, said method comprising the steps of:

inserting a zero sample value between each of said input sample pairs to form a new signal stream which comprises a first spectrum of unaliased signal frequencies and a second spectrum of aliased signal frequencies corresponding to the unaliased signal frequencies of the first spectrum;

modulating the new signal stream; and filtering said new signal stream to remove said second spectrum to provide a dealiased output signal.

9. A method for use in a doppler ultrasound system including a transducer which transmits and receives ultrasound signals, said transducer generating an ultrasound signal and receiving an echo of said signal, wherein said echo is sampled by a sampler to generate a stream of aliased input sample signals, wherein the combination of each of said input sample signals with the next sampled signal in said stream is an input sample pair, said method comprising the steps of:

inserting a zero sample value between each of said input sample pairs to form a new signal stream which comprises a first spectrum of unaliased signal frequencies and a second spectrum of aliased signal frequencies corresponding to the unaliased signal frequencies of the first spectrum; and filtering said new signal stream to remove said second spectrum to provide a dealiased output signal; and wherein said echo contains forward doppler frequency shift components and reverse doppler frequency shift components and wherein said method further comprises the step of separating said forward components from said reverse components to generate respective sample signal streams corresponding to said forward components and said reverse components.

10. A Doppler ultrasound system generating a dealiased audio output signal, comprising:

a transducer for transmitting an ultrasound signal and for receiving an echo of said ultrasound signal;

a sampler for converting said echo into a first stream of input sample signal pairs, wherein each input sample signal pair comprises an in-phase signal and a quadrature phase signal, wherein a first frequency spectrum of said first stream comprises a set of unaliased first frequencies and a set of aliased second frequencies;

a zero inserter component which inserts a zero-frequency sample value between each pair of said input sample signal pairs to form a new signal stream of sample signals, wherein a second frequency spectrum of the new signal stream comprises the first frequency spectrum, a set of unaliased second frequencies and a set of aliased first frequencies; and a filter component which removes said set of aliased second frequencies and generates an audio output signal having a third frequency spectrum comprising said set of unaliased first frequencies and said set of unaliased second frequencies.

11. A system as recited in claim 10 wherein said filter component is selected from a group of filters including digital finite impulse response filters and infinite response filters and analog filters.

12. The system of claim 10, in which the filter component comprises a frequency cutoff defined based upon a spectral adjustment of a spectral display of the echo.

13. The system of claim 10, further comprising a modulator for modulating the first stream.

14. The system of claim 10, further comprising a modulator for modulating the new signal stream.

15. The system of claim 10, wherein said echo contains forward doppler frequency shift components and reverse doppler frequency shift components and wherein said system further comprises a stereo component which separates said forward components from said reverse components to generate respective audio output signals corresponding to said forward components and reverse components.

16. A Doppler ultrasound system including a transducer for transmitting an ultrasound signal and for receiving an echo of said ultrasound signal, wherein said system further includes a sampler for converting said echo into a first stream of input sample signals, wherein the combination of each of said input sample signals in said stream with the next sampled signal in said stream is an input sample pair, said system comprising:

a modulator for modulating said first stream;

a zero inserter component which inserts a zero sample value between each of said input sample pairs to form a new signal stream which comprises a first spectrum of unaliased signal frequencies and a second spectrum of aliased signal frequencies corresponding to the unaliased signal frequencies of the first spectrum; and a filter component which removes said second spectrum from the new signal stream to provide a dealiased output signal.

17. A Doppler ultrasound system including a transducer for transmitting an ultrasound signal and for receiving an echo of said ultrasound signal, wherein said system further includes a sampler for converting said echo into a first stream of input sample signals, wherein the combination of each of said input sample signals in said stream with the next sampled signal in said stream is an input sample pair, said system comprising:

- a zero inserter component which inserts a zero sample value between each of said input sample pairs to form a new signal stream which comprises a first spectrum of unaliased signal frequencies and a second spectrum of aliased signal frequencies corresponding to the unaliased signal frequencies of the first spectrum;
- a modulator for modulating said new signal stream; and
- a filter component which removes said second spectrum from the new signal stream to provide a dealiased output signal.

18. A Doppler ultrasound system including a transducer for transmitting an ultrasound signal and for receiving an echo of said ultrasound signal, wherein said system further includes a sampler for converting said echo into a first stream of input sample signals, wherein the combination of each of said input sample signals in said stream with the next sampled signal in said stream is an input sample pair, said system comprising:

- a zero inserter component which inserts a zero sample value between each of said input sample pairs to form a new signal stream which comprises a first spectrum of unaliased signal frequencies and a second spectrum of aliased signal frequencies corresponding to the unaliased signal frequencies of the first spectrum; and
- a filter component which removes said second spectrum from the new signal stream to provide a dealiased output signal; and
- wherein said echo contains forward doppler frequency shift components and reverse doppler frequency shift components and wherein said system further comprises a stereo components which separates said forward components from said reverse components to generate respective sample signal streams corresponding to said forward components and said reverse components.

19. A method for generating a dealiased audio output signal in a doppler ultrasound system having a transducer which transmits and receives ultrasound signals, said transducer generating an ultrasound signal and receiving an echo of said ultrasound signal, wherein said echo is sampled at a first sampling frequency by a sampler to generate a first stream of input samples, wherein a first frequency spectrum of said stream of input samples comprises a set of unaliased first frequencies and a set of aliased second frequencies, said method comprising the steps of:

- inserting a zero-frequency sample value between each input sample to define a new signal stream of samples, wherein a second frequency spectrum of the new signal stream comprises the set of unaliased first frequencies, a set of unaliased second frequencies and a set of alias-artifact frequencies; and
- filtering said new signal stream to remove said alias-artifact frequencies and generate an audio output signal having a third frequency spectrum comprising said set of unaliased first frequencies and said set of unaliased second frequencies.

20. The method of claim 19, further comprising prior to the step of inserting, the step of modulating the first stream.

21. The method of claim 19, further comprising prior to the step of filtering, the step of modulating the new signal stream.

22. The method of claim 19, in which the step of filtering is performed by a filter having an alterable frequency cutoff, and wherein the method further comprises prior to the step of filtering, the step of correlating the frequency cutoff to a spectral adjustment of a spectral display of the echo.

23. The method of claim 19 wherein said echo contains forward doppler frequency shift components and reverse doppler frequency shift components and wherein said method further comprises the step of separating said forward components from said reverse components to generate respective audio output signals at said filtering step corresponding to said forward components and reverse components.

24. The method of claim 19 in which each input sample comprises an in-phase sample signal and a quadrature phase sample signal.

25. A Doppler ultrasound system for generating a dealiased audio output signal, comprising:

- a transducer which transmits and receives ultrasound signals, said transducer generating an ultrasound signal and receiving an echo of said ultrasound signal;
- means for sampling said echo at a first sampling frequency to generate a first stream of input samples, wherein a first frequency spectrum of said stream of input samples comprises a set of unaliased first frequencies and a set of aliased second frequencies;
- means for inserting a zero-frequency sample value between each input sample to define a new signal stream of samples, wherein a second frequency spectrum of the new signal stream comprises the set of unaliased first frequencies, a set of unaliased second frequencies and a set of alias-artifact frequencies; and
- a filter which removes said alias-artifact frequencies from said new signal stream to generate an audio output signal having a third frequency spectrum comprising said set of unaliased first frequencies and said set of unaliased second frequencies.

26. The system of claim 25, further comprising a modulator for modulating the first stream.

27. The system of claim 25, further comprising a modulator for modulating the new signal stream.

28. The system of claim 25, in which the filter comprises an alterable frequency cutoff, and wherein the frequency cutoff is correlated to a spectral adjustment of a spectral display of the echo.

29. The system of claim 25 wherein said echo contains forward doppler frequency shift components and reverse doppler frequency shift components and wherein said system further comprises means for separating said forward components from said reverse components to generate respective audio output signals corresponding to said forward components and reverse components.

30. The system of claim 25 in which each input sample comprises an in-phase sample signal and a quadrature phase sample signal.

\* \* \* \* \*